United States Patent [19]

Rosman

[11] 4,100,822

[45] Jul. 18, 1978

[54] DRIVE SYSTEM FOR A MOVING MECHANISM

[76] Inventor: Allan Rosman, Dr Fleming 51, Madrid 16, Spain

[21] Appl. No.: 678,434

[22] Filed: Apr. 19, 1976

[51] Int. Cl.[2] .................. F16H 37/06; F16H 47/00; F16D 31/02; B66D 3/16
[52] U.S. Cl. .................................. 74/674; 74/661; 74/665 C; 74/730; 60/484; 254/175.3
[58] Field of Search ............ 74/665 R, 665 A, 665 C, 74/665 L, 665 M, 665 N, 665 P, 661, 664, 730, 665 B, 665 D, 665 E, 674, 675, 677; 60/483, 484, 485

[56] References Cited

U.S. PATENT DOCUMENTS

| | | | |
|---|---|---|---|
| 1,922,887 | 8/1933 | Ellis et al. | 60/484 |
| 3,006,215 | 10/1961 | Musser | 74/661 X |
| 3,151,502 | 10/1964 | Kron et al. | 74/665 B |
| 3,209,543 | 10/1965 | Glover | 74/665 A X |
| 3,315,543 | 4/1967 | Wiken | 74/665 C |
| 3,478,514 | 11/1969 | Parker | 60/484 X |
| 3,548,677 | 12/1970 | Becker | 74/665 A |
| 3,576,106 | 4/1971 | Nowicki | 74/661 X |
| 3,760,654 | 9/1973 | Fisher | 74/665 B X |
| 3,795,068 | 3/1974 | Brunner | 74/661 |
| 3,911,765 | 10/1975 | Reschke et al. | 74/801 |

FOREIGN PATENT DOCUMENTS

| | | | |
|---|---|---|---|
| 157,916 | 8/1939 | Austria | 60/484 |
| 664,212 | 6/1963 | Canada | 74/665 A |
| 1,500,473 | 6/1969 | Fed. Rep. of Germany | 74/661 |

*Primary Examiner*—Samuel Scott
*Assistant Examiner*—Lance W. Chandler
*Attorney, Agent, or Firm*—King, Price, Markva & Becker

[57] ABSTRACT

The drive system comprises an annular member carrying first engagement means which couple to second engagement means carried by drive motor means. The drive motor means are effective to rotate the annular member about an axis of rotation. Specific features of the invention include the use of hydraulic drive motor means operated through the use of a hydraulic system. The drive system also includes a pair of annular members which cooperate with respect to each other in combination with drive motor means disposed adjacent to each of the annular members. A plurality of drive motors may be used in some of the particular combinations and a single drive motor having a central pinion means and a satellite group of gears may also be used in conjunction with the drive motor means.

86 Claims, 24 Drawing Figures

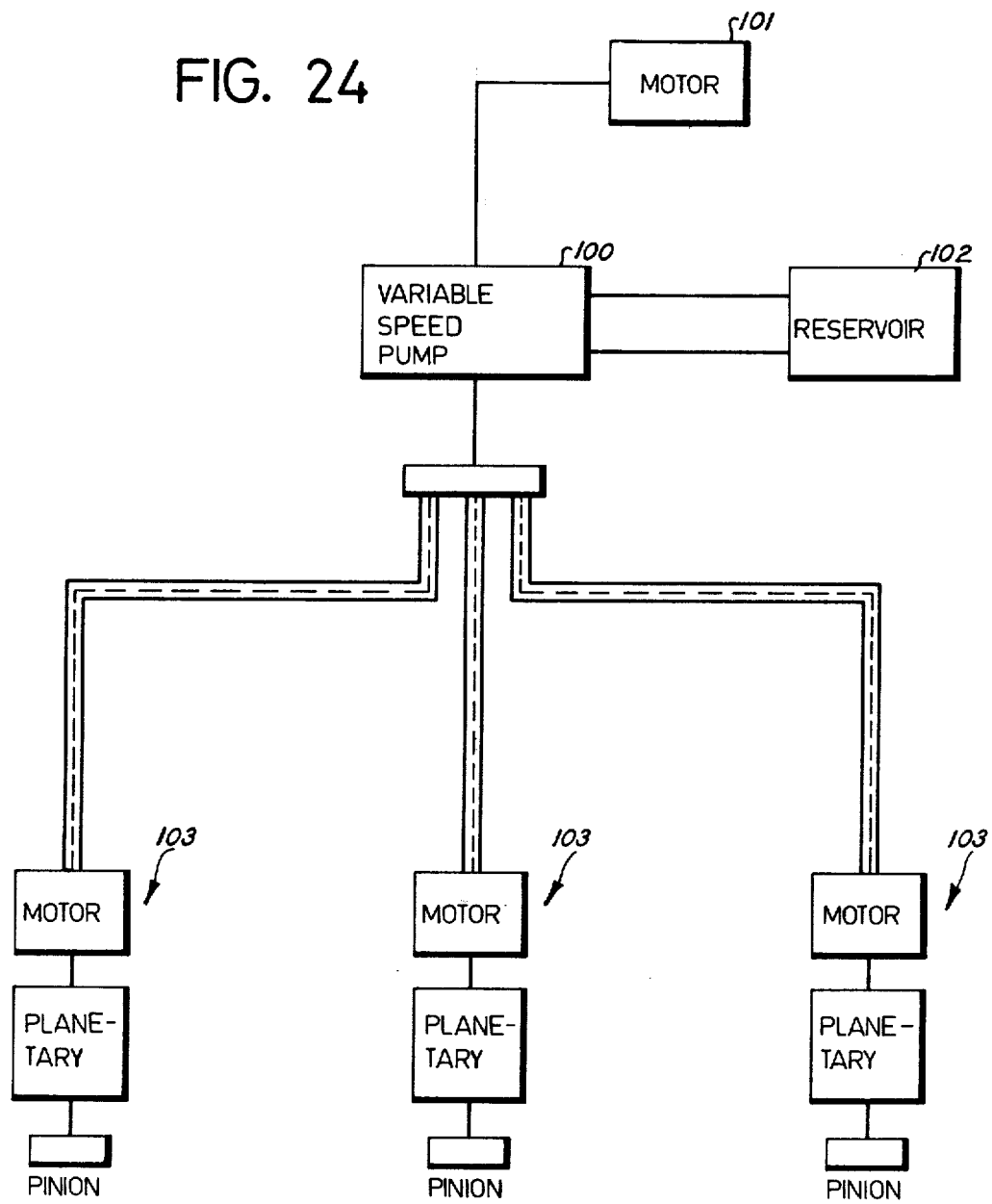

DRIVE SYSTEM FOR A MOVING MECHANISM

BACKGROUND OF THE INVENTION

This invention relates to a drive system which may be used in connection with numerous types of moving mechanisms.

The use of a large diameter annular member or wheel to effect rotational movement is well known. In these prior art arrangements, however, it is necessary to use extremely large gear boxes to move heavy loads. Such heavy loads provide very large radial forces directly related to torque loads. The use of extremely large gear boxes requires extremely heavy equipment.

The prior art use of large diameter bearings has been primarily for non-continuous applications. Continuous use of the large ring or annular member has not been effected. Practical limits on radial force, torque, and horsepower requirements exist at peripheral speeds associated with 40 revolutions per minute. Based upon these requirements, under certain applications, such as in a cableway, a gear box of from 4 to 10 tons in weight must be used requiring special construction and extremely large cost. Smaller gear boxes are simply not able to handle the radial forces associated with such an annular member.

Related prior art equipment uses the extremely large gear box as a transmission with a hydraulic system interconnected therewith. There presently is a need for special equipment to operate a direct current electrical system.

Spanish Pat. Nos. 422,314 issued July 21, 1975 and 433,238 issued Sept. 4, 1975, describe generally the background related to the drive system as disclosed herein. Particularly with respect to the latter Spanish disclosure, there are problems associated with the operation of such a cableway. Inherent load problems are associated with the charge or passenger load being moved up and down an inclined surface. These include problems associated with breaking of a cableway for the purpose of stopping a downhill charge.

PURPOSE OF THE INVENTION

The primary object of this invention is to provide a drive system which inherently overcomes prior art problems associated with drive systems usng a rotatably mounted annular member.

Another object of the invention is to provide a drive mechanism which is adaptable to a multiplicity of applications such as boat propellers, industrial rotative furnaces, cable drums for operating elevators, concrete pumps and trucks, and motive power for moving passengers and articles of all types.

A further object of this invention is to provide a drive system incorporating the use of large diameter annular members which may be rotated in a continuous manner in one direction or another with the capacity of handling all axial and radial forces associated therewith.

A still further object of this invention is to provide a drive system having annular wheels which may be freely rotatable or driven and being operational under extremely variable conditions.

Yet another object of this inventon is directed to a drive system which enables the application for effecting transportation of elements like chairs, mill-hoppers, boxes, passenger cabins and continuous belt means for effecting operation of a continuous loading and unloading capability.

A further object of this invention is to provide a drive system which will enable the construction of a bi-monocable cableway including two parallel endless cables set in parallel wherein each of the cables has both the tractor and carrying functions.

Still a further object of this invention is to provide a drive system which may be used to establish a bi-monocable cableway wherein both the cables may be operated in perfectly synchronized fashion so that transport mechanisms may be adequately supported and moved therealong through the use of transport frame means that are pivotally mounted with respect to the cables.

SUMMARY OF THE INVENTION

The invention as disclosed herein is directed to a drive system comprising an annular member carrying first engagement means and being rotatably mounted. A plurality of drive motor means is disposed in spaced relationship with respect to each other along the circumference of the annular member. Second engagement means located on the drive motor means couple with the first engagement means. All of the drive motor means are operated simultaneously to rotate the annular member about an axis of rotation.

Another feature of the invention is the use of a pair of annular members wherein each of the annular members are constructed as noted immediately hereinabove. Drive motor means are disposed adjacent to each of the annular members and carry second engagement means which couple to the first engagement means. The drive motor means are operated in such a manner as to move each of the annular members synchronously about a common axis of rotation.

A further feature of the invention is the use of hydraulic drive motors in combination with a hydraulic system providing a common hydraulic pressure source to each of the hydraulic drive motors thereby obtaining common drive forces. The drive motors are in parallel hydraulic connection with respect to each other. The use of a hydraulic system provides a desired delayed braking of a downhill charge cableway. There is both a dynamic braking and a security braking incorporated with the hydraulic system of this invention. An advantage of this invention is that the entire system may be operated through the use of a standard squirrel-cage electric motor. The nature of the flow within the hydraulic system is extremely slow, i.e., 5 meters per second. The hydraulic fluid is operating under an extremely high pressure of about 3,000 to 5,000 pounds per square inch.

A further feature of the invention is the fact that the hydraulic system may be operated in a completely closed circuit. Over-the-counter items such as variable speed axial piston motors and pumps may be used in the combination being disclosed herein. Standard planetary gear boxes may be used in combination with the hydraulic motors. Thus, maintenance cost and time for repairs are held at an absolute minimum through the use of the combination of structural elements set forth herein. There is a real control on speed, acceleration, and bracking independent of any operator. An electric controller for hydrostatic drives is used thereby eliminating the disadvantages of the prior art manual systems. A variable displacement pump is used in combination with the electric controller for hydrostatic drives.

With the drive system of this particular application, it is possible to adopt the speed of each wheel or annular member independently to produce precisely the same speed of travel in each cable of the bi-monocable cableway system disclosed herein. Each of the annular members are driven with independent rotation.

BRIEF DESCRIPTION OF DRAWINGS

Other objects of this invention will appear in the following description and appended claims, reference being made to the accompanying drawings forming a part of the specification wherein like reference characters designate corresponding parts in the several views.

FIG. 24 is a further schematic hydraulic circuit diagram for a drive system made in accordance with this invention.

DESCRIPTION OF SPECIFIC EMBODIMENTS

Figure 1:
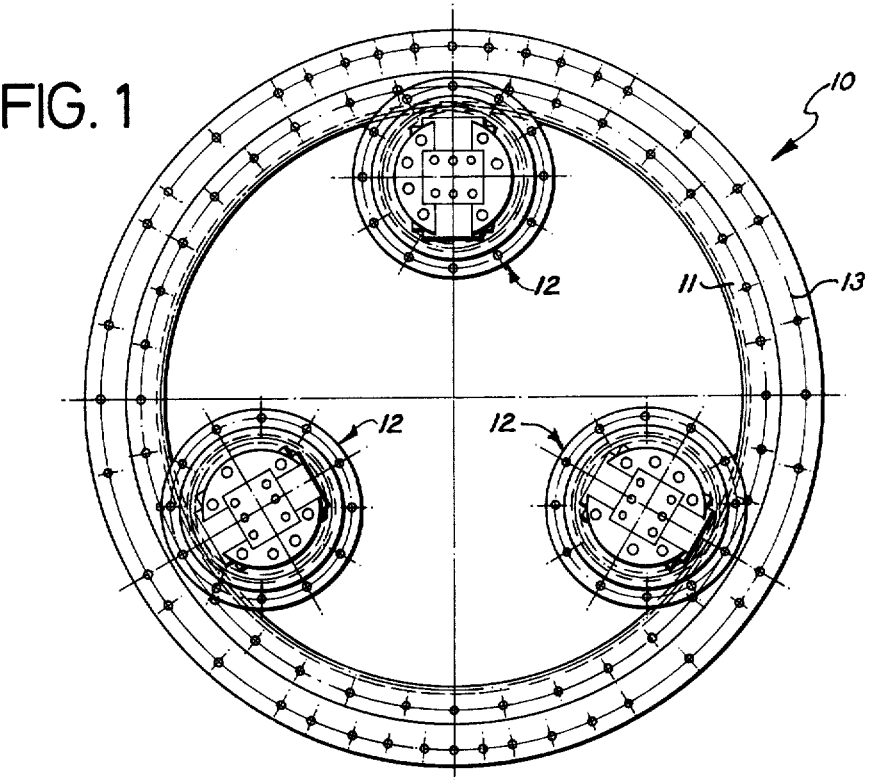
FIG. 1 is an elevational view of a drive system made in accordance with this invention.
Figure 4:
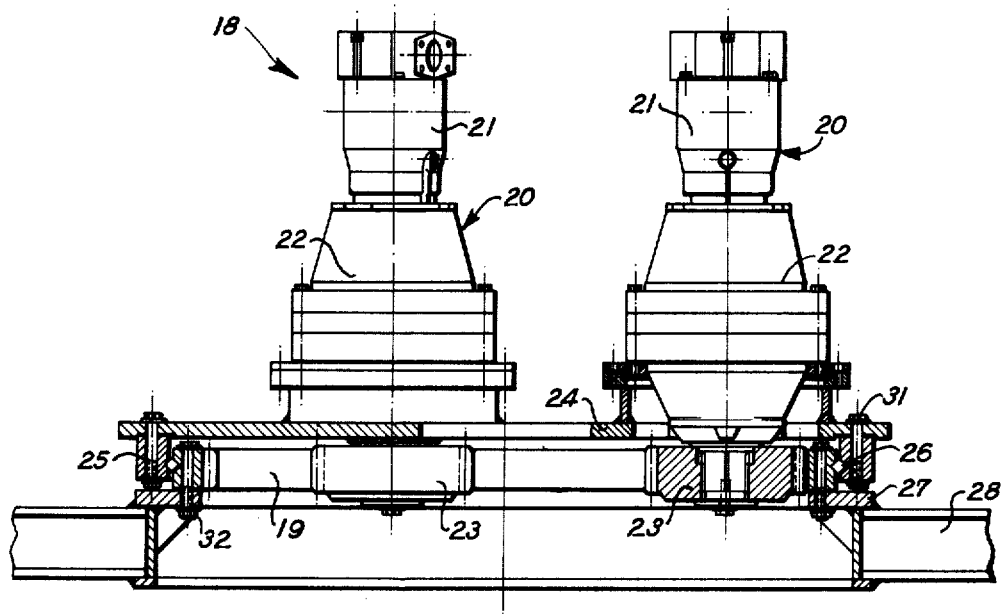
FIG. 4 is a sectional view taken along line IV—IV of FIG. 3.

More specifically, referring to the drawings, FIG. 1 shows a drive system, generally designated 10. Drive system 10 includes an inner annular or ring member 11 carrying first engagement means which consist of gear teeth in this particular embodiment. A plurality of drive motors 12 include a pinion having gear teeth which mesh with the gear teeth of annular member 11. The ring member 11 is rotatably disposed within the outer fixed annular member 13. All of the drive motors 12 operate simultaneously to rotate the annular member 11 about an axis of rotation. The gear teeth constituting the first engagement means are disposed along the entire inside circumferential surface of ring member 11. The circumferential surface is parallel to the axis of rotation. The gear teeth constituting second engagement means are disposed on a pinion member forming a part of the drive motors 12. A more detailed view of a similar relationship between a pinion and inner annular member is shown in FIG. 4. As is evident from the drawings and the description herein, each of the drive motors 12 are structurally independent with respect to each other. Additionally, it can be said that the pinion means associated with each motor 12 is structually independent with respect to each other.

Figure 2:
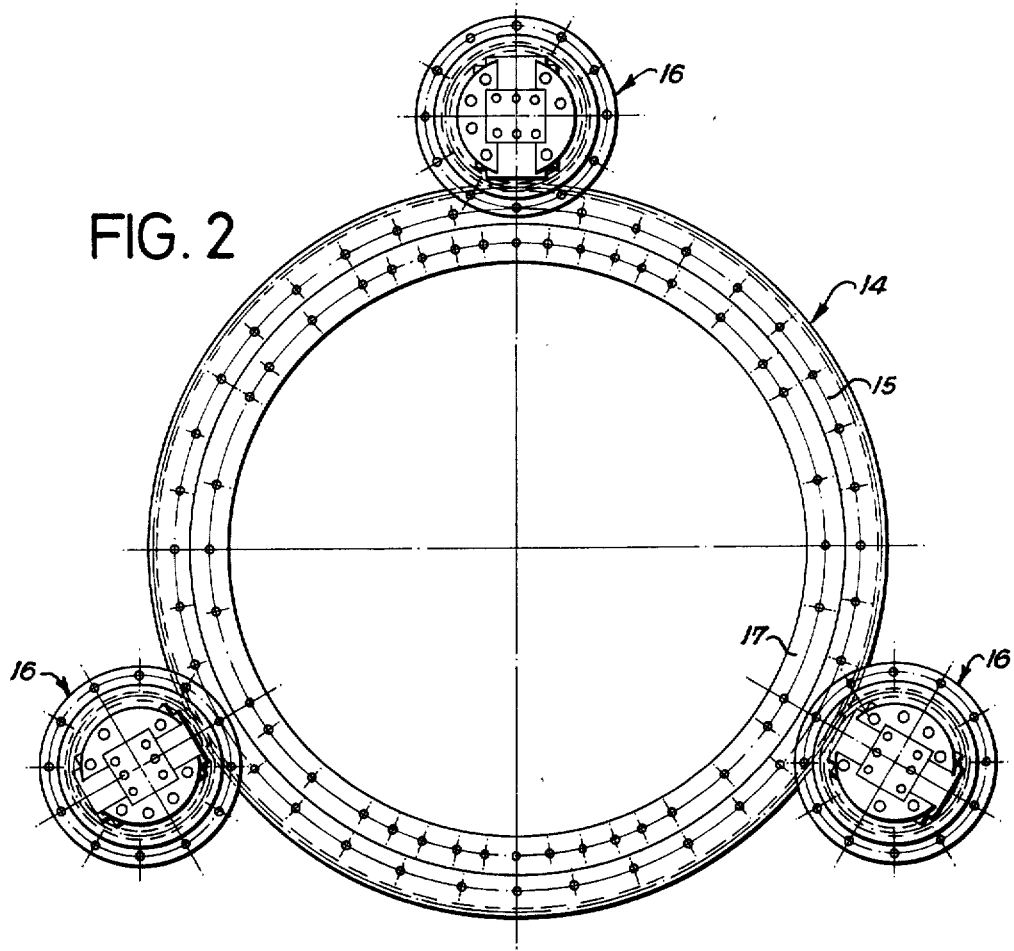
FIG. 2 is an elevational view of another embodiment of a drive system made in accordance with this invention.

FIG. 2 discloses another embodiment wherein the drive system, generally designated 14, has a rotatably disposed outer annular member 15 carrying first engagement means which couple with second engagement means associated with drive motors 16. Drive motors 16 are disposed in spaced relationship with respect to each other along the outer circumference of annular or ring member 15. Ring member 15 is rotatably disposed about the fixed inner annular member 17. Again, first engagement means consist of gear teeth disposed along the entire outer circumferential surface of ring member 15. The outer surface is parallel to the axis of rotation. The second engagement means constitute a pinion having gear teeth and disposed on each drive motor 16. As in the first embodiment, complete rotation of rotatably mounted ring member 15 is effected upon activation of the drive motors 16.

Figure 3:
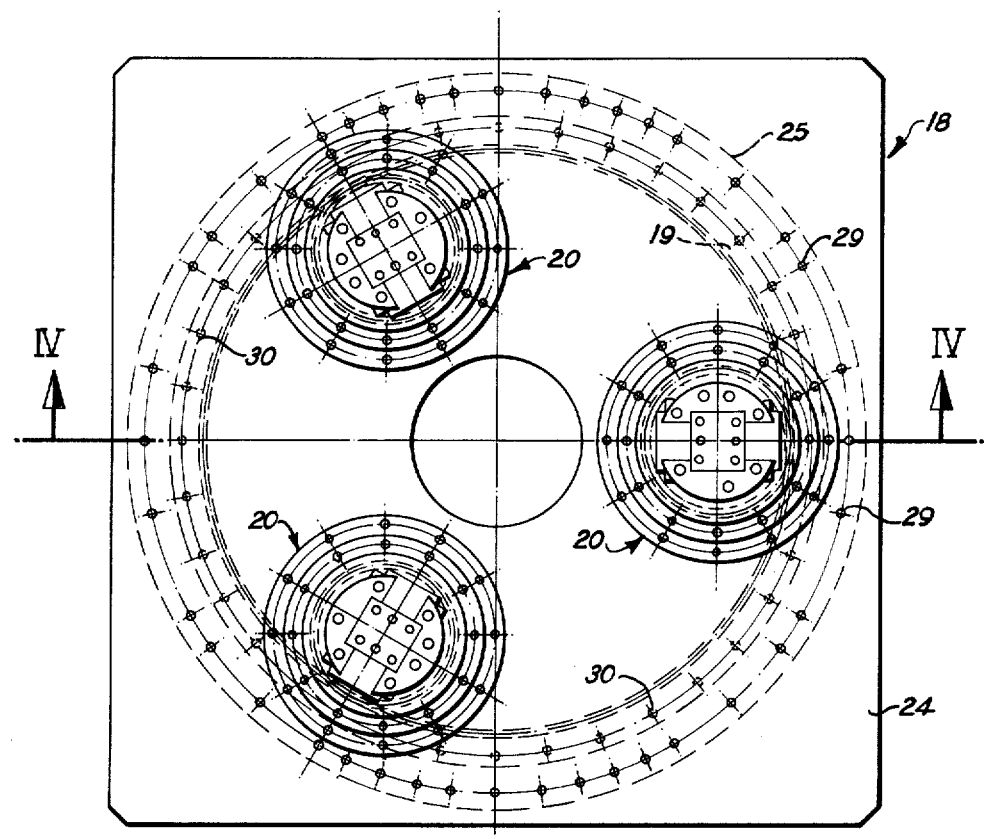
FIG. 3 is a further embodiment of a drive system made in accordance with this invention.

Drive system 18, as shown in FIGS. 3 and 4, includes a rotatably mounted inner annular member 19 rotated by drive motor assemblies 20 which are fixedly disposed on the frame member 24. Bolts 31 extend through openings 29 and fix outer ring member 25 to frame member 24. Bolts 32 extend through openings 30 and fix inner ring member 19 to frame member 27. The frame 27 constitutes a hub portion of a wheel 28 which is only partially shown in FIG. 4. Wheel 28 is a drive wheel in a cableway system which is a further feature of my invention described hereinbelow.

Each drive motor assembly 20 includes a hydraulic drive motor 21, a planetary gear mechanism 22 and a pinion member 23. The inner circumferential surface of the annular member 19 includes gear teeth around its entire circumference. Pinions 23 have gear teeth which mesh with the gear teeth on ring member 19 to effect rotation thereof. The torque output of each of the hydraulic motors 21 is the same with respect to each other. The hydraulic motors 21 are standard off-the-shelf items. In the embodiment as shown, the motors 21 are known as fast rotating and have lower torque output. When using the smaller motors there is an advantage that the system is less expensive with respect to initial capitalization and maintenance. Planetary transmission and gear boxes 22 are used in combination to develop the amount of torque necessary to rotate ring members moving up to 300-ton loads.

Figure 5:
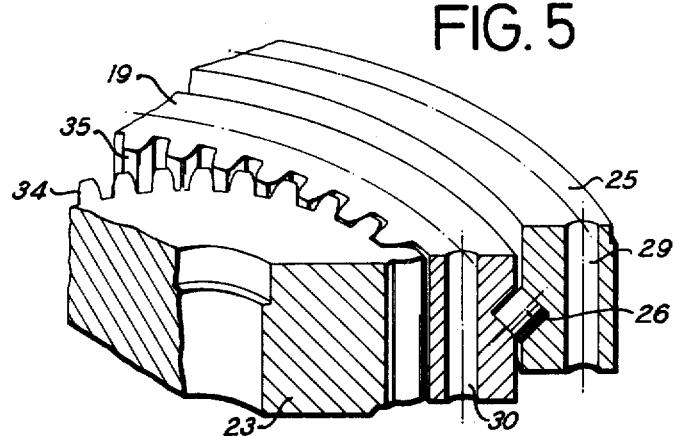
FIG. 5 is a fragmentary perspective view of the drive system of FIG. 4.

The type of annular bearing unit including stationary ring member 25 and inner annular gear ring 19 is known. A plurality of bearing members 26 are disposed therebetween so that ring member 19 rotates with respect to ring member 25. A more detailed relationship existing in this type of ring unit is shown in FIG. 5.

Pinion 23 includes gear teeth 34 which mesh with gear teeth 35 disposed along the entire circumference of inner ring member 19. Openings 29 and 30 contain bolts 31 and 32, respectively, in the assembled unit.

In the known types of structure, there is a single bearing unit having a single drive pinion engaged therewith which is driven by a motor. However, the single drive motor has not been found sufficient for applications involving continuous rotation of ring member 19 with respect to fixed ring member 25. A further feature of the invention as described hereinbelow requires a continuous rotation at peripheral speeds associated with 40 revolutions per minute.

Unexpectedly, the desired results heretofore not available in the prior art are achieved by using a plurality of hydraulic drive motors interconnected in parallel to a common source of hydraulic fluid pressure for operating the entire system. This relationship of a hydraulic system in combination with the use of a plurality of hydraulic drive motors produces a common drive force which has enabled the development of a bi-monocable system which is completely operational. This is a completely new result which is totally unexpected as discussed hereinbelow.

Figure 6:
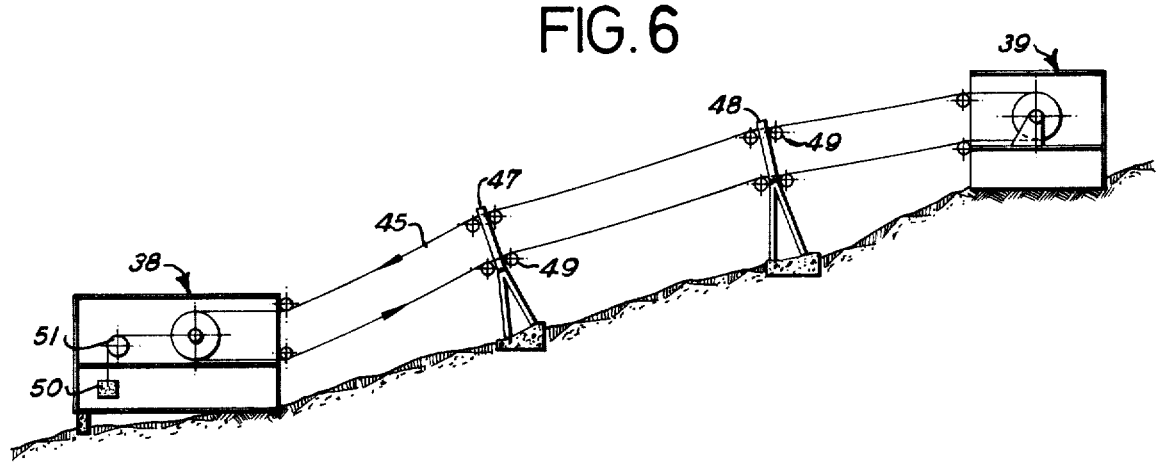
FIG. 6 is a schematic elevational view of a cableway system made in accordance with this invention.
Figure 7:
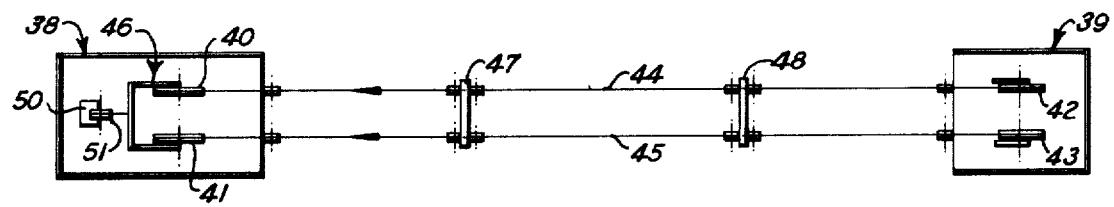
FIG. 7 is a top plan view of the cableway system of FIG. 6.

The bi-monocable system as disclosed herein constitutes one embodiment of a conveying system which has been heretofore unavailable. Figs. 6 and 7 diagrammatically show a typical bi-monocable cableway having a lower station 38 and an upper station 39. Lower station 38 includes vertically disposed drive wheels 40 and 41 with a counterweight system 46. The upper station 39 includes wheels 42 and 43. Monocables 44 and 45 form endless, closed-loop conveyors supported at intermediate points by tower structures 47 and 48 having pulleys 49. Counterweight system 46 includes counterweight 50 and tension pulley 51. System 46 acts to maintain proper tension in cables 44 and 45.

The bi-monocable cableway has been known since before the turn of the century. However, such a system has not been used because it has been virtually impossible to have the two separate cables operate simultaneously. Two basic problems exist with prior art systems.

First, the drive wheels 40, 41, 42 and 43 cannot be built with absolutely the same diameter. Consequently, different distances are traveled by the endless loop conveyor extending therearound. The difference exists even if the pairs of wheels 40, 41, 42 and 43 are directly connected to each other by a common drive shaft.

Secondly, prior art pairs of wheels cannot be driven at precisely the same speed. The peripheral speed has to be synchronized. Synchronized speed control of the drive wheels in a dual cable system has not been possible until now. An important feature of this invention is that the speed of each wheel is adapted independently with respect to each other to produce precisely the same speed of travel in each cable. That is, each drive wheel is rotated with independent drive means as disclosed herein. A separate hydraulic drive mechanism is used to drive each wheel in the pair of drive wheels through the use of a common source of hydraulic fluid pressure. The counterweight system used in combination with the new drive system compensates for the load charge on the cableway, temperature changes causing contraction and expansion, and wear due to operation. Positive tension is maintained in the cables so that they do not droop or sag over a continued period of use. These factors all directly affect the longitudinal structural characteristics of the endless loop cable conveyors.

Horizontal symmetry of a dual cable system cannot be maintained in the prior art. That is, the lateral spacing between the cables 44 and 45 changes, thereby causing derailment from pulleys 49 and the drive wheels 40, 41, 42 and 43 in prior art systems. Furthermore, prior art dual cable systems cannot withstand the shock of high lateral winds.

As a feature of this invention, stabilizing assemblies fix the horizontal distance between parallel cables 44 and 45. In addition, the stabilizing mechanisms maintain the longitudinal alignment of cables 44 and 45 moving around the drive wheels disposed at the upper and lower stations of the cableway system.

Figure 8:
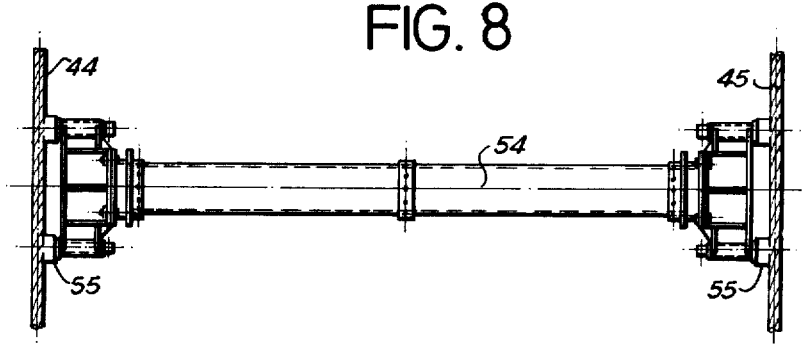
FIGS. 8-10 show three different embodiments of a stabilizing mechanism usable with a cableway system made in accordance with this invention.
Figure 9:
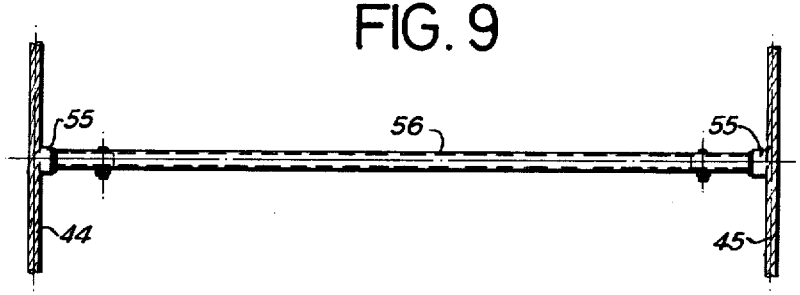
Figure 10:
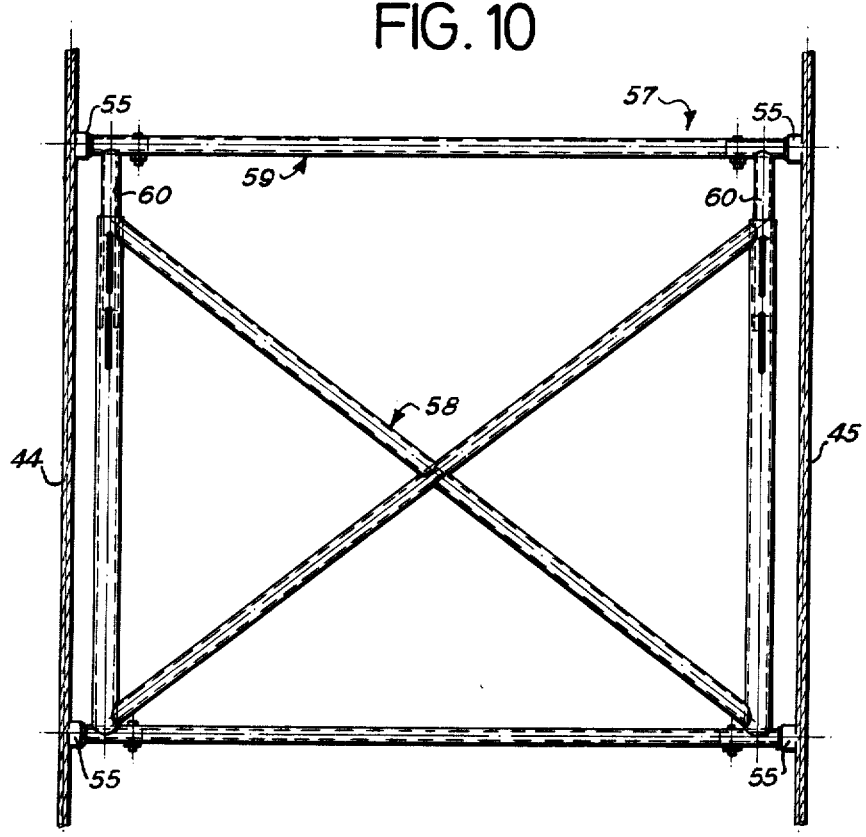
Figure 11:
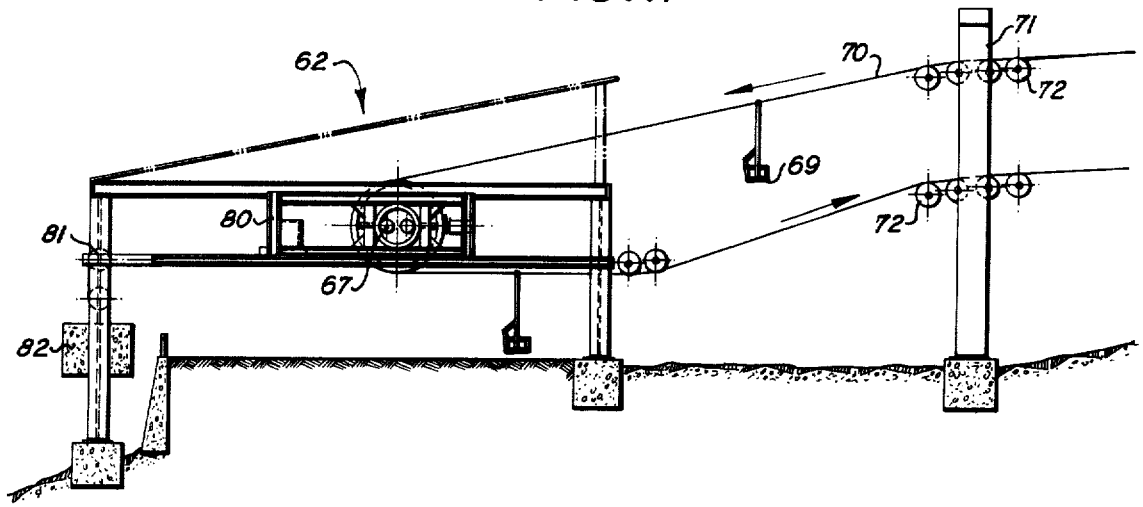
FIG. 11 is a side elevational view of one end of a chairlift cableway system made in accordance with this invention.
Figure 12:
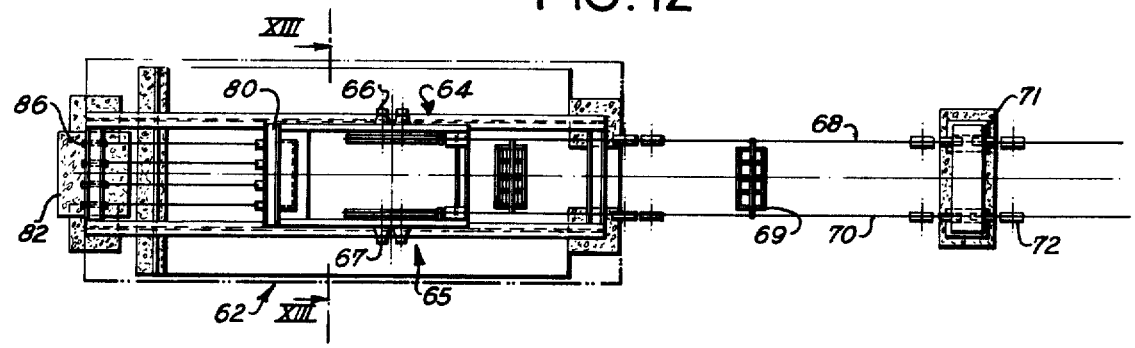
FIG. 12 is a top plan view of the embodiment of FIG. 11.
Figure 13:
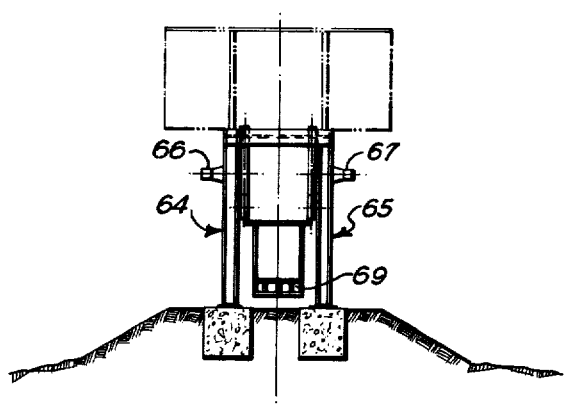
FIG. 13 is a sectional view taken along line XIII—XIII of FIG. 11.
Figure 14:
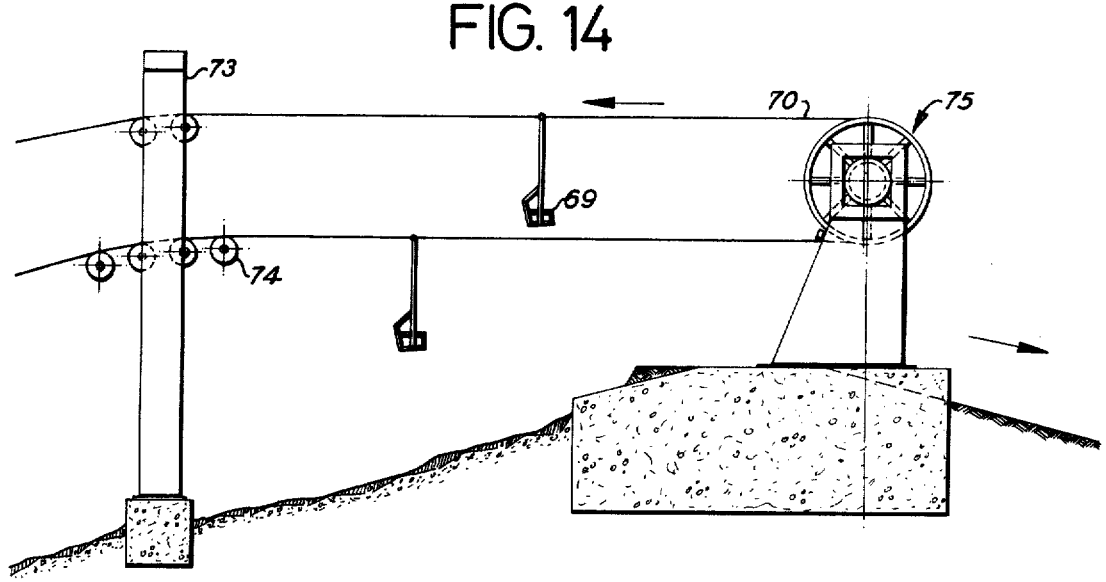
FIG. 14 is an elevational view at the exit or egress end of the chairlift system shown in FIG. 11.
Figure 15:
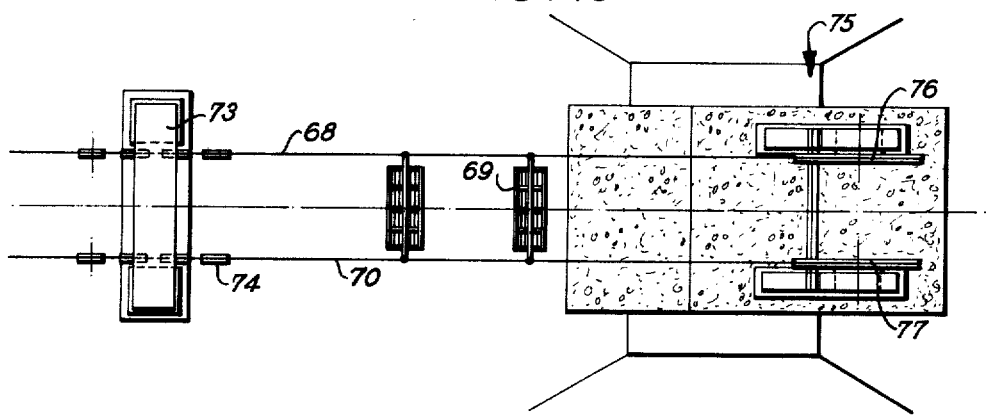
FIG. 15 is a top plan view of the embodiment shown in FIG. 14.
Figure 16:
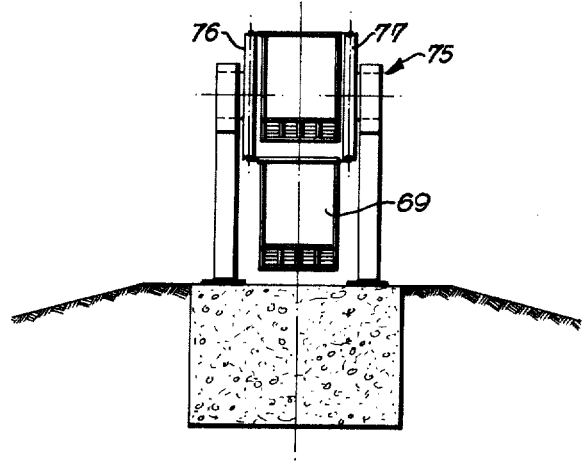
FIG. 16 is an end elevational view of the embodiment shown in FIG. 14.
Figure 17:
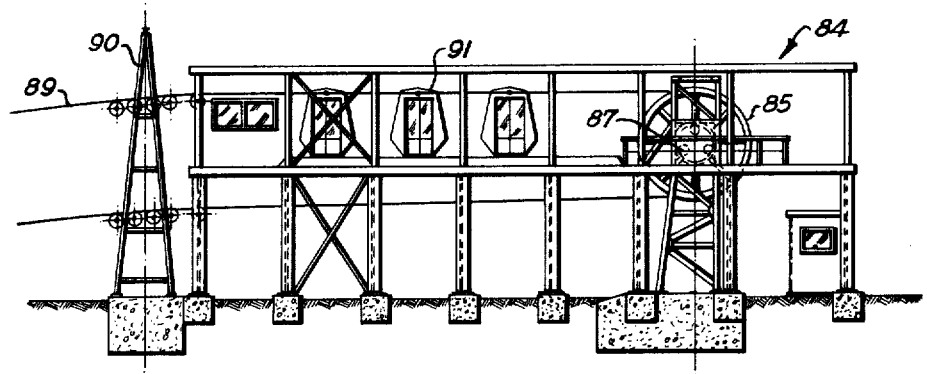
FIG. 17 is the drive station for a further embodiment of a cabin cableway system made in accordance with this invention.
Figure 18:
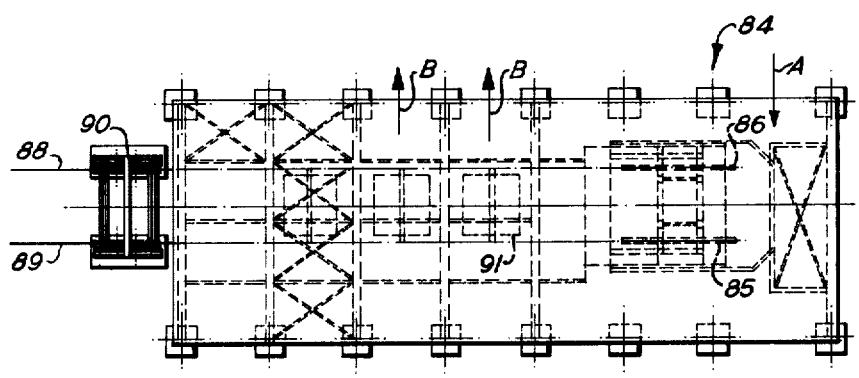
FIG. 18 is a top plan view of the embodiment of FIG. 17.
Figure 19:
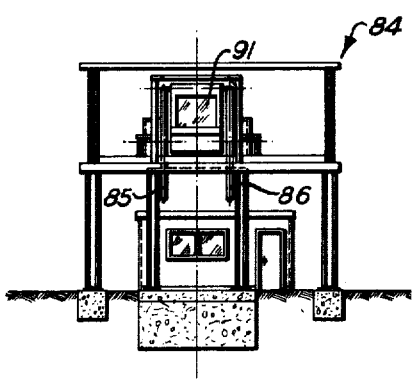
FIG. 19 is an end elevational view of the embodiment of FIG. 17.
Figure 20:
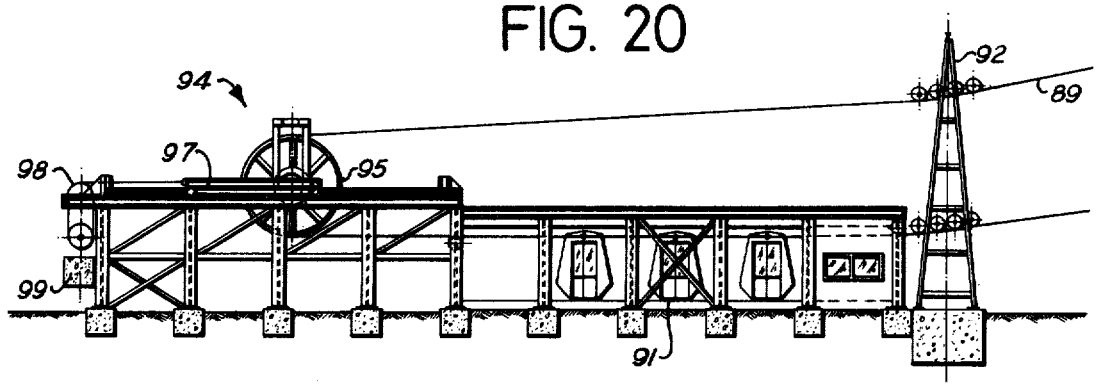
FIG. 20 is an elevational view of the remote end of the embodiment shown in FIG. 17.
Figure 21:
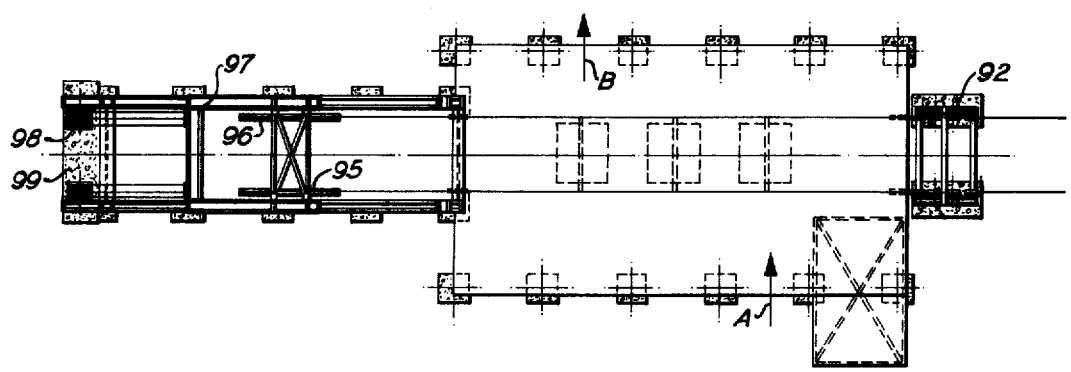
FIG. 21 is a top plan view of the embodiment shown in FIG. 20.
Figure 22:
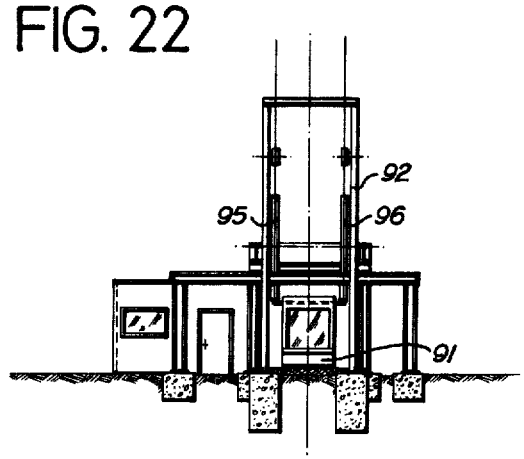
FIG. 22 is an end elevational view of the embodiment shown in FIG. 20.

Three separate embodiments of stabilizing mechanisms are shown in FIGS. 8 through 10. Each of these stabilizing assemblies may be associated with a personnel carrier or may operate separately. In any event, these stabilizing mechanisms are longitudinally disposed along the entire length of the cableway.

FIG. 8 shows a stabilizing member 54, that is fixed at two locations at each end thereof to the cables 44 and 45. The connection is conventional and generally referred to as a fixed-grip connection. The fasteners 55 are conventionally interwoven within the cable. Each of the embodiments as shown have the same type of fastener connection at each end thereof. The stabilizer bar 54 is usable as a carrying member for a chair or cabin which will necessarily be rotatably connected thereto.

The stabilizer bar 56 as shown in FIG. 9 is more commonly used by itself. The stabilizing system 47 as shown in FIG. 10 includes a crossbar structure 58 which is slidable with respect to the stabilizing section 59. The system 57 is designed to be adjustable to any longitudinal variations in the cables 44 and 45. Frame elements 60 are slidably disposed within the crossbar structure 58 as shown.

A first embodiment of a bi-monocable cableway made in accordance with this invention is shown in FIGS. 11 through 16. The lower drive station 62 includes a pair of drive assemblies 64 and 65. Each assembly 64 and 65 has a rotatably mounted annular member and a stationary member as disclosed hereinabove. Drive assembly 64 includes two hydraulic drive motors 66 and drive assembly 65 includes two hydraulic drive motors 67. Drive motors 66 and 67 operate from a common source of hydraulic fluid pressure as discussed above with respect to the earlier embodiments of the hydraulic drive systems. Drive motors 66 and 67 are in parallel hydraulic connection with respect to each other and move each of the ring members about an axis of rotation. In this specific embodiment, a closed hydraulic system is provided to affect the common hydraulic pressure source to each of the hydraulic drive motors 66 and 67.

The drive wheel assemblies of the drive systems 64 and 65 are laterally spaced with respect to each other thereby defining a free and unobstructed open space therebetween. The hydraulic drive motors 66 and 67 are disposed adjacent each drive wheel on the side opposite the open space as shown.

In another embodiment of this invention, as single hydraulic motor is used in combination with a single pinion having gears. A satellite group of gears is disposed between the pinion and the inner circumferential surface of the rotatably disposed annular ring member. The satellite gears mesh with the gear teeth of the pinion on one side and with the gear teeth of the annular member on the other side. Each drive wheel assembly of each pair is driven by a similar system. Here, the plurality of hydraulic motors consists of two motors which drive the rotatable annular members via the satellite group of gears. These two hydraulic motors operate via a common hydraulic pressure source thereby obtaining common drive forces at each of the drive wheel assemblies.

The upper cableway station 75 includes two wheels 76 and 77 around which cables 68 and 70, respectively, are disposed. Station 75 works with lower drive station 62 shown in FIGS. 11 through 13. Intermediate towers 71 and 73 support the cables 68 and 70, respectively, on pulleys 72 and 74.

The diameter of cables 68 and 70 determines the diameter of the wheels around which the cables are disposed. This is a well-known fact in the prior art. For example, a cable having a diameter of 38 millimeters will require a wheel having a maximum of about 3.6 meters or about 12 feet. By leaving the pair of drive members laterally displaced, it is possible to pass the personnel carrier directly through the wheel. Very large diameter wheels are needed when a common drive shaft is used for each pair of wheels.

The proper sag is maintained in cables 68 and 70 by the counterweight system having a carriage 80, a counterweight 82 and pulleys 81. As noted, the counterweight system compensates for any wear within the cableway. Both wheels of drive systems 64 and 65 are fixed with respect to each other on carriage 80.

A bi-monocable system as disclosed herein must use individual drive mechanisms for each rotating annular member. A common source of power is used to drive the mechanisms which operate in parallel with respect to each other. The embodiments herein disclose hydraulic drive mechanisms. When one of the drive mechanisms undergoes stoppage at one wheel, the flow of fluid will be stopped due to the difference in pressure between the wheels. When this difference in pressure reaches a particular value, the system can be designed to automatically stop.

A cableway system of the type described in FIGS. 11 through 16 may involve a weight of 50 tons. Normally, the braking of such a system is adjusted with a delay to stop a downhill charge. Such a delay is inherently a part of the hydraulic system of the parent invention. Thus, dynamic braking is available if there were a power failure or some other event requiring the stopping of a downhill charge. The hydraulic system of this invention is capable of effecting a dynamic start and braking of both uphill and downhill charges wherein large masses are moved by rotating systems. A 4 to 10-ton gear box is required in prior art applications to a cableway of this design thereby involving high construction and maintenance costs. That is, smaller gear boxes cannot handle the radial and torque forces involved in operating the prior art cableway systems.

Another embodiment of a bi-monocable cableway system is disclosed in FIGS. 17 through 22. The drive station 84 includes two laterally displaced wheel mechanisms 85 and 86 each driven by three hydraulic motors 87 as disclosed in the FIGS. 3-5 hereinabove. Parallel cables 88 and 89 support cabins 91 used as personnel carriers. Cables 88 and 89 are supported by towers 90 and 92 and extend around wheels 95 and 96 located at the counterweight station 94. Wheels 95 and 96 are fixedly disposed on a counterweight carriage 97 and maintained under tension via counterweight 99 pulling on a line extending around pulleys 98.

Ingress of passengers is effected along the Arrows A while egress is effected along Arrows B. (See FIGS. 18 and 21.) Cabins 91 are spaced an appropriate distance apart to avoid hitting each other when swinging back and forth due to winds or while changing direction of movement when passing between the laterally spaced drive wheels at either end of the cableway.

Cabins 91 may include up to eight passengers. Thus, the total weight may be as large as 200 tons. Problems of inertia are faced with such a load. Normally, a direct current electrical system working through a transformer is used to operate such a prior art system. However, the hydraulic drive system of this invention eliminates such a large electrical system.

Figure 23:
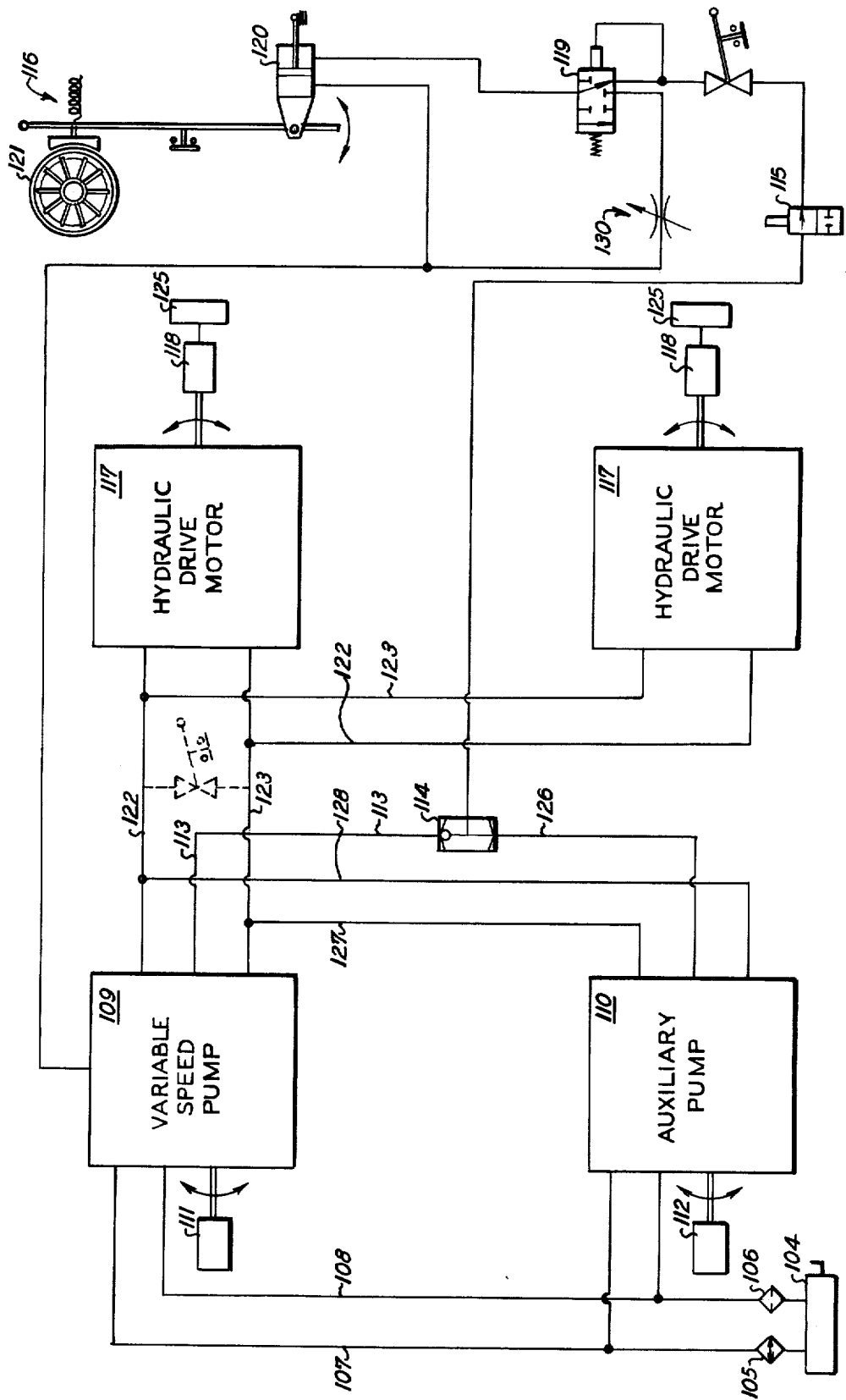
FIG. 23 is a schematic hydraulic circuit diagram used in operating the drive system of this invention.

A further feature of the invention provides a simple 40 to 300 horsepower variable speed pump for pumping the hydraulic fluid to each of the motors which in turn operate through planetary gear mechanisms for driving a pinion. FIGS. 23 and 24 show diagrammatic circuits of hydraulic fluid flow for operating hydraulic drive motors. A variable speed pump is standard equipment available commercially. In FIG. 24, a standard squirrel-cage motor 101 is used to operate the variable speed pump 100. Hydraulic fluid is pumped from the reservoir 102 to each of the hydraulic motor assemblies 103 as shown.

All of the parts of this system are available over-the-counter thereby providing a very important advantage of the disclosed system over prior art systems. The commercially available variable speed pump includes an electric controller for hydrostatic drives. This electric controller provides the key for braking in the cableway system of this invention. Complete control of speed, acceleration and braking is independent of any operator through the use of the variable speed pump having such an electrical controller. All the disadvantages of a manually operated system are completely eliminated.

The bi-monocable system has several basic advantages over a single cable system. Cabins 91 have more stability as disclosed in the embodiment of FIGS. 17 through 22. Derailment of the cables is virtually eliminated because of the stability provided in the horizontal direction. Stabilizing mechanisms developed for the bi-monocable system efficiently handle a complete resolution of forces. The resolution of forces in a monocable cableway remains a problem. The cables themselves may be used as a security line. In this feature of the invention, a cable runs in rubber. If for any reason a derailment of the cable is effected, grounding results. Consequently, a switch is thrown and the entire system is automatically stopped. The use of this particular bi-monocable system may be effected in combination with a belt to provide a belt conveyor.

The annular members of each pair of drive mechanisms include sheave means on the side thereof facing each other toward the open space. The closed loop line or cable is disposed around corresponding sheave means at first and second locations to form two parallel endless moving means. Each end of transport frame means is attached to the two parallel endless moving means. The attachment of the transport frame means may be fixed or detachable. Transport means including either chair 69 or a cabin 91 hangs downwardly with respect to the transport frame means. In another embodiment of a conveying system, the transport means may comprise a belt forming a continuous conveyor means.

The details of a typical hydraulic system made in accordance with this invention is shown in FIG. 23. Hydraulic fluid is maintained in the reservoir 104 and travels between pumps 109 and 110 via lines 107 and 108. Filters 105 and 106 are disposed within the fluid lines 107 and 108, respectively. The squirrel-cage motor 111 brings fluid from the reservoir 104 to fill up the entire system with hydraulic fluid without making the cableway work. This simply makes the whole system in the armed or ready position. The variable speed motor 109 is a standard motor which includes an open circuit gear pump used to charge the system in the manner described. The variable speed pump 109 also includes a Moog control device (not shown) which provides the necessary electric power to operate the pump 109. Again, this is a standard or conventional control device which is a part of the pump 109.

A hydraulic fluid pressure builds up in the line 113 which leads to the shuttle valve 114. Auxiliary pump 110 does not operate while pump 109 operates. While shut-off valve 115 is closed, the auxiliary security brake system 116 will always be on. With the security brake system always on, there is an additional braking function present that is not present in prior art cableway systems.

Under proper operating conditions, fluid pressure in line 113 should build up to approximately 225 pounds per square inch. Once a switch or button is actuated, electrical power is given to the electric controller for the hydrostatic drive system which forms a part of the variable speed pump 109. At that moment, the shut-off valve 115 is opened. If fluid pressure has built up to the desired predetermined amount, standard fluid valve 119 will supply fluid to the activator 120 thereby operating the auxiliary security brake 116. That is, security brake 116 will be open so that the drive wheel 121 can turn.

In other words, there is a definite check in the system of the present invention. Both proper electrical voltage and fluid pressure must be present in the system. Electrical voltage drives the variable speed pump 109 and fluid pressure operates shut-off valve 115. Unless the proper pressure is built up in line 113, the auxiliary security brake 116 will not open thereby keeping the wheels 121 from operating under improper fluidic conditions. Wheels 121 are those disposed in a working station of a cableway system around which the endless closed-loop cables are disposed for forming the basis of a conveyor means.

Once security brake 116 is open, then hydraulic fluid is pumped through lines 122 and 123 to the hydraulic drive motors 117 disposed adjacent each of the wheels 121. Pinions 125 are in contact with the rotating annular member forming a part of the wheels 121 as described herein with respect to earlier embodiments of the disclosed invention. Pinions 125 are driven via the planetary gear transmission 118. When considering the hydraulic system as a whole, the variable speed pump 109 which drives or produces the hydrostatic flow of hydraulic fluid will itself act as a brake.

The hydraulic motor geared to the drive wheel of an aerial lift mechanism will perform the function required of a service brake. That is, when the lift is stopped or shut off for any reason, the hydraulic system will stop and hold the lift at its maximum load. There is a significant difference in the system of the present invention over any prior art system which requires the use of a normal gear box having a special design. Such a gear box design must operate with loads of from 4 to 10 tons of radial forces.

The system as disclosed in FIG. 23 shows hydraulic motors 117 being operated in parallel with a common source of hydraulic fluid. That is, the variable speed pump 109 provides a common source of pressure to each of the motors 117. Each motor 117 will transform the common source of fluid pressure into power for attending the transmissions 118 which in turn will drive pinions 125.

If something happens to the variable speed pump 109, an auxiliary pump 110 of the same type will be actuated by the operation of the shuttle valve 114 thereby activating the brake control line 126. Lines 127 and 128 then become operational for providing hydraulic fluid flow to drive motors 117 via lines 122 and 123 as shown. An independent energy source is made available for the drive system if primary power fails. Thus, the cable system can be emptied under emergency conditions. A closing speed control 130 prevents backlash in the system and comes behind the main braking effect of the system. As noted, the hydraulic system of this invention is completely closed.

While a drive system for a moving mechanism has been shown and described in detail, it is obvious that this invention is not to be considered as being limited to the exact form disclosed, and that changes in detail and construction may be made therein within the scope of the invention, without departing from the spirit thereof.

Having thus set forth and disclosed the nature of this invention, what is claimed is:

1. A drive system comprising:
   a. a pair of annular members,
   b. each said annular member being laterally spaced with respect to each other and carrying first engagement means,
   c. means disposed adjacent each annular member for rotatably mounting the annular members,
   d. drive motor means disposed adjacent to each annular member of said pair and carrying second engagement means which couple to the first engagement means on each said annular member, and
   e. means for operating the drive motor means to move each of the annular members about an axis of rotation.

2. The system as defined in claim 1 wherein
   said first engagement means includes gear teeth disposed on a surface of the annular member, and
   said second engagement means includes a central pinion means and a satellite group of gears,
   said satellite gears being meshed with said gear teeth.

3. The system as defined in claim 2 wherein
   said gear teeth being disposed along an entire circumferential surface of the annular member, and
   said satellite gears being effective to cause complete rotation of the annular member upon activation of said drive motor means.

4. The system as defined in claim 1 wherein
   each said drive motor means comprises a hydraulic drive motor.

5. The system as defined in claim 4 wherein
   said operating means includes a hydraulic system providing a common hydraulic pressure source to each of the hydraulic drive motors to obtain common drive forces at each said drive motor.

6. The system as defined in claim 5 wherein the drive motors are in parallel hydraulic connection with respect to each other.

7. The system as defined in claim 1 wherein
said drive motor means includes a plurality of drive motors disposed in spaced relationship with respect to each other along the circumference of the annular member,
said first engagement means including gear teeth disposed along an entire circumferential surface of the annular member, and
said second engagement means including a pinion means disposed on each drive motor to mesh with said gear teeth and cause complete rotation of the annular member upon activation of said drive motor means.

8. The system as defined in claim 7 wherein
each said drive motor means comprises a hydraulic drive motor,
said operating means comprises a closed hydraulic system providing a common hydraulic pressure source to each of the hydraulic drive motors to obtain common drive forces at each said drive motor.

9. The system as defined in claim 1 wherein
each said annular member carries sheave means and closed-loop means is disposed around said sheave means carried by each said annular member to form two movable parallel endless closed loops.

10. The system as defined in claim 9 wherein
transport frame means is attached at each end thereof to the two parallel endless moving means.

11. The system as defined in claim 10 wherein
said transport frame means is fixedly connected at each end thereof to the two parallel endless moving means.

12. The system as defined in claim 10 wherein
said transport frame means is releasably connected at each end thereof to the two parallel endless moving means.

13. The system as defined in claim 9 wherein
belt means extends between the two movable parallel endless closed loops to form a continuous conveyor means.

14. A drive system comprising:
a. a pair of annular members having a common axis of rotation and being laterally spaced with respect to each other,
b. said pair of annular members defining a free and unobstructed open space therebetween and each annular member carrying first engagement means,
c. means rotatably mounting the annular member,
d. hydraulic drive motor means disposed adjacent a circumferential surface of said annular member and carrying second engagement means which couple to the first engagement means on said annular member, and
e. hydraulic pump means for operating the drive motor means to move each of the annular members about an axis of rotation,
f. said hydraulic drive motor means being disposed adjacent each annular member on the side opposite said open space,
g. said hydraulic operating pump means providing a common hydraulic pressure source to each of the drive motor means to obtain common drive forces at each said drive motor means.

15. The system as defined in claim 14 wherein
said hydraulic drive means includes a plurality of drive motors disposed in spaced relationship with respect to each other along the circumference of the annular member,
said first engagement means includes gear teeth disposed on a surface of the annular member, and
said second engagement means includes pinion means disposed on each drive motor to mesh with said gear teeth.

16. The system as defined in claim 14 wherein
said first engagement means includes gear teeth disposed along an entire circumferential surface of the annular member, and
said second engagement means includes pinion means disposed on each drive motor to mesh with said gear teeth and cause complete rotation of the annular member upon activation of said drive motor means.

17. The system as defined in claim 14 wherein
said first engagement means includes gear teeth disposed on a surface of the annular member, and
said second engagement means includes a central pinion means and a satellite group of gears,
said satellite gears being meshed with said gear teeth.

18. The system as defined in claim 17 wherein
said gear teeth being disposed along an entire circumferential surface of the annular member, and
said satellite gears being effective to cause complete rotation of the annular member upon operation of said drive motor means.

19. The system as defined in claim 14 wherein
said rotatably mounting means includes stationary means being juxtaposed each annular member and bearing means being disposed therebetween.

20. The system as defined in claim 19 wherein
said stationary means includes an annular member fixedly mounted to a frame member.

21. The system as defined in claim 20 wherein
said first engagement means includes gear teeth disposed along the entire inside circumferential surface that is parallel to the axis of rotation, and
said motor means is fixedly disposed on said frame member.

22. The system as defined in claim 14 wherein
each said annular member carries a sheave means on the side thereof facing each other toward said open space.

23. A drive system comprising:
a. a pair of annular members each carrying first engagement means and being laterally spaced with respect to each other with a common axis of rotation,
d. means rotatably mounting each said annular member,
c. hydraulic drive motor means disposed adjacent a circumferential surface of each said annular member and carrying second engagement means which couple to the first engagement means on each said annular member, and
d. hydraulic pump means for synchronously operating each of the drive motor means to move each of the annular members about said axis of rotation with common drive forces,
e. said pump means including a single electric motor having an electric controller for hydrostatic drives.

24. The system as defined in claim 23 wherein
said pair of annular members defines a free and unobstructed open space therebetween, said hydraulic drive motor means being disposed adjacent each annular member on the side opposite said open space, said hydraulic operating means provides a common hydraulic pressure source to each of the drive motor means to obtain common drive forces at each said drive motor means.

25. The system as defined in claim 24 wherein said hydraulic drive means includes a plurality of drive motors disposed in spaced relationship with respect to each other along the circumference of the annular member, said first engagement means includes gear teeth disposed on a surface of the annular member, and said second engagement means includes pinion means disposed on each drive motor to mesh with said gear teeth.

26. The system as defined in claim 24 wherein said first engagement means includes gear teeth disposed along an entire circumferential surface of the annular member, and said second engagement means includes pinion means disposed on each drive motor to mesh with said gear teeth and cause complete rotation of the annular member upon activation of said drive motor means.

27. The system as defined in claim 24 wherein said first engagement means includes gear teeth disposed on a surface of the annular member, and said second engagement means includes a central pinion means and a satellite group of gears, said satellite gears being meshed with said gear teeth.

28. The system as defined in claim 27 wherein said gear teeth being disposed along an entire circumferential surface of the annular member, and said satellite gears being effective to cause complete rotation of the annular member upon operation of said drive motor means.

29. The system as defined in claim 24 wherein said rotatably mounting means includes stationary means being juxtaposed each annular member and bearing means being disposed therebetween.

30. The system as defined in claim 29 wherein said stationary means includes an annular member fixedly mounted to a frame member.

31. The system as defined in claim 30 wherein said first engagement means includes gear teeth disposed along the entire inside circumferential surface that is parallel to the axis of rotation, and said motor means is fixedly disposed on said frame member.

32. The system as defined in claim 24 wherein each said annular member carries a sheave means on the side thereof facing each other toward said open space.

33. The system as defined in claim 23 wherein there are two pairs of annular members, one pair being disposed at a first location and the other pair being disposed at a second location a spaced distance from the first location, each said pair of annular members having a common axis of rotation and being laterally spaced with respect to each other, each said pair of annular members defining a free and unobstructed open space therebetween, said hydraulic drive motor means being disposed adjacent each annular member of one of the pairs on the side of each annular member facing away from said open space, said hydraulic operating means providing a common hydraulic pressure source to each of the drive motor means to which it is connected to obtain common drive forces at each said drive motor means.

34. The system as defined in claim 33 wherein said hydraulic drive means includes a plurality of drive motors disposed in spaced relationship with respect to each other along the circumference of the annular member, said first engagement means includes gear teeth disposed on a surface of the annular member, and said second engagement means includes pinion means disposed on each drive motor to mesh with said gear teeth.

35. The system as defined in claim 33 wherein said first engagement means includes gear teeth disposed along an entire circumferential surface of the annular member, and said second engagement means includes pinion means disposed on each drive motor to mesh with said gear teeth and cause complete rotation of the annular member upon activation of said drive motor means.

36. The system as defined in claim 33 wherein said first engagement means includes gear teeth disposed on a surface of the annular member, and said second engagement means includes a central pinion means and a satellite group of gears, said satellite gears being meshed with said gear teeth.

37. The system as defined in claim 36 wherein said gear teeth being disposed along an entire circumferential surface of the annular member, and said satellite gears being effective to cause complete rotation of the annular member upon operation of said drive motor means.

38. The system as defined in claim 33 wherein said rotatably mounting means includes stationary means being juxtaposed each annular member and bearing means being disposed therebetween.

39. The system as defined in claim 38 wherein said stationary means includes an annular member fixedly mounted to a frame member.

40. The system as defined in claim 39 wherein said first engagement means includes gear teeth disposed along the entire inside circumferential surface that is parallel to the axis of rotation, and said motor means is fixedly disposed on said frame member.

41. The system as defined in claim 33 wherein each said annular member carries a sheave means on the side thereof facing each other toward said open space.

42. The system as defined in claim 41 wherein closed loop line means is disposed around corresponding sheave means at said first and second locations to form two parallel endless moving means.

43. The system as defined in claim 42 wherein all the annular members are disposed in a vertical direction with respect to the ground, and support means is disposed intermediate said first and second locations to provide intermediate support to the parallel endless moving means.

44. The system as defined in claim 42 wherein transport frame means is attached at each end thereof to the two parallel endless moving means.

45. The system as defined in claim 44 wherein said transport frame means is fixedly connected at each end thereof to the two parallel endless moving means.

46. The system as defined in claim 44 wherein said transport frame means is releasably connected at each end thereof to the two parallel endless moving means.

47. The system as defined in claim 44 wherein all the annular members are disposed in vertical direction with respect to the ground, and support means is disposed intermediate said first and second locations to provide intermediate support to the parallel endless moving means.

48. The system as defined in claim 47 wherein transport means hangs downwardly with respect to the transport frame means, and the transport frame means is pivotally mounted with respect to the endless moving means.

49. The system as defined in claim 48 wherein said transport means comprises a cabin for containing passengers.

50. The system as defined in claim 49 wherein said transport means comprises a chair means for containing passengers.

51. The system as defined in claim 48 wherein said transport means comprises a belt means forming a continuous conveyor means.

52. A drive system comprising:
 a. an annular member carring first engagement means,
 b. stationary annular means disposed adjacent said annular member for rotatably mounting said annular member which is effective to rotate in a continuous manner in one direction,
 c. a plurality of hydraulic drive motor means being structurally independent with respect to each other and disposed in spaced relationship with respect to each other along the circumference of the annular member,
 d. each said hydraulic drive motor means comprising a fast rotating motor having a lower torque output and carrying second engagement means which directly couple with said first engagement means, and
 e. single pump means for simultaneously operating all of the hydraulic drive motor means from a common hydraulic pressure source providing common drive forces to rotate the annular member about an axis of rotation.

53. A system as defined in claim 52 wherein said first engagement means includes gear teeth disposed on a surface of the annular member, and said second engagement means includes structurally independent pinion means disposed on each drive motor to mesh with said gear teeth.

54. The system as defined in claim 53 wherein each said hydraulic drive motor means includes a planetary gear mechanism disposed between each said pinion means and said gear teeth.

55. The system as defined in claim 52 wherein said first engagement means includes gear teeth disposed along an entire circumferential surface of the annular member, and said second engagement means includes structurally independent pinion means disposed on each drive motor to mesh with said gear teeth and cause complete rotation of the annular member upon activation of said drive motor means.

56. The system as defined in claim 55 wherein said circumferential surface is inside the annular member and parallel to the axis of rotation.

57. The system as defined in claim 55 wherein said circumferential surface is outside the annular member and parallel to the axis of rotation.

58. The system as defined in claim 52 wherein said stationary annular rotatably mounting means is juxtaposed the annular member and includes bearing means being disposed therebetween.

59. The system as defined in claim 58 wherein said stationary annular means includes an annular member fixedly mounted to a frame member.

60. The system as defined in claim 7 wherein said first engagement means includes gear teeth disposed along the entire inside circumferential surface that is parallel to the axis of rotation, and said motor means are fixedly disposed on said frame member.

61. The system as defined in claim 7 wherein said first engagement means includes gear teeth disposed along the entire outside circumferential surface that is parallel to the axis of rotation, and said motor means are fixedly disposed on said frame member.

62. The system as defined in claim 52 wherein said hydraulic drive motor means includes a planetary gear mechanism disposed between each said second engagement means and said first engagement means.

63. The system as defined in claim 52 wherein the hydraulic drive motors are in parallel hydraulic connection with respect to each other.

64. The system as defined in claim 52 wherein said operating pump means comprises a closed hydraulic system providing said common hydraulic pressure source to each of the hydraulic drive motors to obtain common drive forces at each said drive motor.

65. The system as defined in claim 52 wherein said single pump means includes a single electric motor.

66. The system as defined in claim 52 wherein said single pump means comprises a variable speed pump.

67. The system as defined in claim 66 wherein said variable speed pump includes an electric controller for hydrostatic drives.

68. A drive system comprising:
 a. two pairs of annular members,
 b. one pair being disposed at a first location and the other pair being disposed at a second location a spaced distance from the first location,
 c. each annular member in each said pair of annular members having a common axis of rotation and being laterally spaced with respect to each other,
 d. each said pair of annular members having a free and unobstructed open space defined between the annular members of each said pair,
 e. means rotatably mounting each annular member,
 f. hydraulic drive motor means disposed adjacent a circumferential surface of each annular member of one of said pairs and carrying second engagement means which couple to the first engagement means on each said annular member, and g. hydraulic pump means for operating the drive motor means to move each of the annular members about an axis of rotation, h. said hydraulic drive motor means disposed adjacent each annular member of one of said pairs being on the side of each annular member facing away from said open space, i. said hydraulic operating pump means providing a common hydraulic pressure source to each of the drive motor means to which it is connected to obtain common drive forces at each said drive motor means.

69. The system as defined in claim 68 wherein said hydraulic drive means includes a plurality of drive motors disposed in spaced relationship with respect to each other along the circumference of the annular member, said first engagement means includes gear teeth disposed on a surface of the annular member, and said second engagement means includes pinion means disposed on each drive motor to mesh with said gear teeth.

70. The system as defined in claim 68 wherein said first engagement means includes gear teeth disposed along an entire circumferential surface of the annular member, and said second engagement means includes pinion means disposed on each drive motor to mesh with said gear teeth and cause complete rotation of the annular member upon activation of said drive motor means.

71. The system as defined in claim 68 wherein said first engagement means includes gear teeth disposed on a surface of the annular member, and said second engagement means includes a central pinion means and a satellite group of gears, said satellite gears being meshed with said gear teeth.

72. The system as defined in claim 71 wherein said gear teeth being disposed along an entire circumferential surface of the annular member, and said satellite gears being effective to cause complete rotation of the annular member upon operation of said drive motor means.

73. The system as defined in claim 68 wherein said rotatably mounting means includes stationary means being juxtaposed each annular member and bearing means being disposed therebetween.

74. The system as defined in claim 68 wherein said stationary means includes an annular member fixedly mounted to a frame member.

75. The system as defined in claim 74 wherein said first engagement means includes gear teeth disposed along the entire inside circumferential surface that is parallel to the axis of rotation, and said motor means is fixedly disposed on said frame member.

76. The system as defined in claim 68 wherein each said annular member carries a sheave means on the side thereof facing each other toward said open space.

77. The system as defined in claim 76 wherein closed-loop line means is disposed around corresponding sheave means at said first and second locations to form two parallel endless moving means.

78. The system as defined in claim 77 wherein all the annular members are disposed in a vertical direction with respect to the ground, and support means is disposed intermediate said first and second locations to provide intermediate support to the parallel endless moving means.

79. The system as defined in claim 77 wherein transport frame means is attached at each end thereof to the two parallel endless moving means.

80. The system as defined in claim 79 wherein said transport frame means is fixedly connected at each end thereof to the two parallel endless moving means.

81. The system as defined in claim 79 wherein said transport frame means is releasably connected at each end thereof to the two parallel endless moving means.

82. The system as defined in claim 79 wherein all the annular members are disposed in vertical direction with respect to the ground, and support means is disposed intermediate said first and second locations to provide intermediate support to the parallel endless moving means.

83. The system as defined in claim 82 wherein transport means hangs downwardly with respect to the transport frame means, and the transport frame means is pivotally mounted with respect to the endless moving means.

84. The system as defined in claim 83 wherein said transport means comprises a cabin for containing passengers.

85. The system as defined in claim 83 wherein said transport means comprises a chair means for containing passengers.

86. The system as defined in claim 83 wherein said transport means comprises a belt means forming a continuous conveyor means.

* * * * *